A. D. BAKER.
REVERSIBLE VARIABLE CUT-OFF VALVE GEAR.
APPLICATION FILED SEPT. 5, 1911.
1,036,059.
Patented Aug. 20, 1912.
2 SHEETS—SHEET 1.
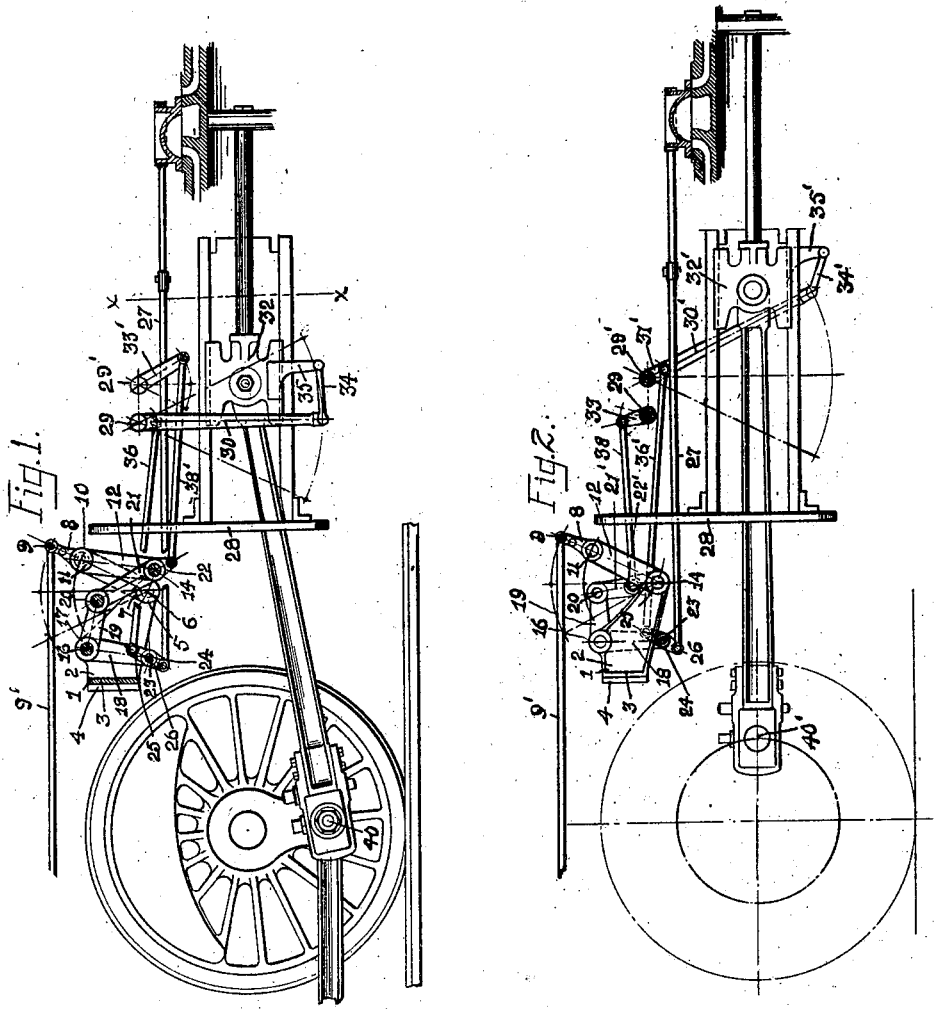
WITNESSES:
INVENTOR A. D. BAKER.
REVERSIBLE VARIABLE CUT-OFF VALVE GEAR.
APPLICATION FILED SEPT. 5, 1911.
1,036,059.
Patented Aug. 20, 1912.
2 SHEETS—SHEET 2.
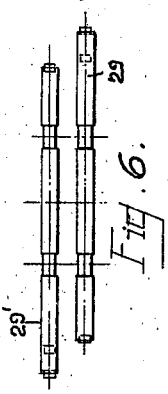
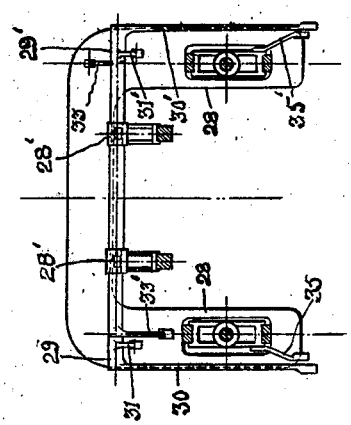
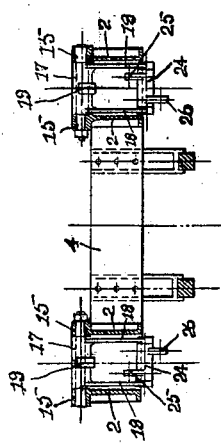
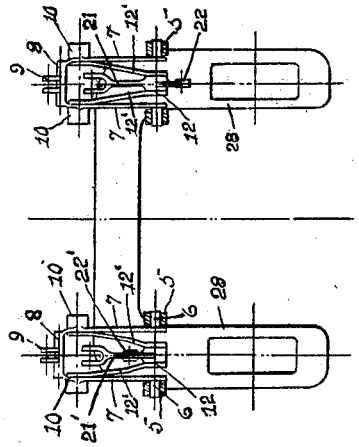
WITNESSES:
INVENTOR.

UNITED STATES PATENT OFFICE.

ABNER D. BAKER, OF SWANTON, OHIO.

REVERSIBLE VARIABLE-CUT-OFF VALVE-GEAR.

1,036,059.  Specification of Letters Patent.  Patented Aug. 20, 1912.

Application filed September 5, 1911. Serial No. 647,463.

*To all whom it may concern:*

Be it known that I, ABNER D. BAKER, a citizen of the United States, and a resident of Swanton, in the county of Fulton and State of Ohio, have invented a new and useful Improvement in Reversible Variable-Cut-Off Valve-Gears for Locomotives, of which the following is a specification.

My invention relates to a reversible variable cut-off valve gear for locomotives.

In application Serial Number 484,788 I have shown and described a valve gear of the kind, by which the lateral motion of the eccentric rod, as variably produced and controlled by an adjustable radius rocker and transmitted by a bell crank, is so combined with the motion produced by a lever fulcrumed on an arm of the bell crank and connected to the cross head as to produce the improved results therein set forth and described.

My present invention has for its object to eliminate the eccentric rod and lever aforesaid of each engine of the locomotive, and without modification of the principle of construction and operation of my said former valve gear and the results produced thereby, to substitute for the eccentric rod and lever of each engine means to transmit the motion of its cross head to perform the function and produce the same movements in the gear of its companion engine that are performed and produced in my said former gear by the eccentric rod of the companion engine, and also to perform the function and produce the same movement in its own gear as are performed and produced in my said former gear by the said lever. I accomplish these objects by the construction and combination of parts as hereinafter described and illustrated in the drawings, in which—

Figure 1 is a view in side elevation of the valve gear, of the right engine of a locomotive, equipped in accordance with my invention. Fig. 2 is a similar view of the gear of a left engine, from the right side of the locomotive. Fig. 3 is a side elevation of the rocker yoke, radius rocker and bell crank link of the valve gears of a right and left engine, looking forward. Fig. 4 is a cross section of the gear frames in the vertical axial plane of the bell crank bearings, and showing a side elevation of the bell crank. Fig. 5 is a transverse section of main frame in the plane *x—x* of Fig. 1 looking rearward, and Fig. 6 is a top view of the rock shafts.

In the drawings 1—1 are supporting bracket frames, each having the sides 2 extending parallel from the base plate 3. The brackets are secured to the end portions of a cross bar 4, secured transverse the main frame of the locomotive, with the sides 2 projecting forward. The sides 2 of each bracket frame are provided at their forward ends with the alined bearings 5, in which are journaled the trunnions 6 of a rocker yoke comprising the arms 7 extending parallel from and integral with the arch 8, the trunnions 6 of the yoke being alined and extending oppositely from the outer end portion of the arms 7. The arch 8 of the rocker yoke of each engine is centrally provided with the bifurcated lug 9, to which is pivotally connected one end of the reach rod 9' of the engine. The arms 7 near the arch 8 are provided with the alined bearings 10 in which are journaled the trunnions 11 of a radius rocker 12 comprising a pair of arms 12' each having a trunnion 11 at its upper end portion, and having their lower end portions connected by a pivot pin 14 at a radius from the trunnions 11 equal to the radius of the trunnions 11 from the trunnions 6 of the rocker yoke.

Rearward of and above the bearings 5, the sides 2 of the bracket frame are provided with the alined bearings 15 in which are journaled the trunnions 16 of a bell crank comprising the axle 17 having a pair of downwardly extending arms 18, one near each side 2 of the frame, and the arm 19 extending forward centrally from the axle 17 at near a right angle to the arms 18. To the forward end of the arm 19 is pivotally connected by a pin 20, one end of a link bar 21, which near its opposite end is pivoted on the pin 14 of the radius rocker 12.

The link bar 21 of the right engine is provided with an extension 22 of its lower end, and the link bar 21' of the left engine is provided above the pin 14 with an enlargement 22' having a bore to receive a pivot pin. The arms 18 of each bell crank are connected at their lower end by a fixed pin 23 upon which is mounted a rock sleeve 24 having the rock arm 25, extending upward near one end of the sleeve, and the rock arm 26 near the opposite end extending downward, to the free end of which is pivotally connected the free end of the valve stem 27 of the respective engine.

Forward of the guide yokes 28 of the right and left engines there are journaled in bearing supports 28', parallel and transverse the main frame of the locomotive, the rock shafts 29 and 29'. The shaft 29 has an end portion extending over and beyond the guide bars of the right engine upon which is fixedly mounted a rock lever 30 which extends downward below the lower guide bar and rearward of the cross head 32 of the right engine when in a position central of its stroke, a short arm 31 parallel with the lever 30, extending downward above the guide bars. The lower end of the lever 30 is connected by a link rod 34 extending forward to an arm 35 secured to the forward end of the cross head 32, and the short arm 31 is connected by a rod 36 with the rock arm 25 of the bell crank. On the opposite end of the shaft 29 is secured a rock arm 33 of reduced length which extends upward oppositely to the arm 30, to the free end of which is pivoted one end of a connecting rod 38, the rearward end of which is pivoted to the enlargement 22' of the link bar 21' of the left engine.

The rock shaft 29' has an end portion extending over and beyond the guide bars of the left engine to which is secured a rock lever 30', extending below the lower guide bar of the left engine and forward of the cross head 32' of that engine when in a position central of its stroke. The lower end of the rock lever 30' is connected by a link rod 34' to the arm 35' secured to the forward end of the cross head 32', and over the guide bars of the left engine the shaft 29' is provided with the rock arm 31' which is connected to the arm 25 of the rock sleeve 24 of the bell crank of the left engine by a connecting rod 36'. On the opposite end of the rock shaft 29' is mounted a rock arm 33' which extends downward and is proportionately longer than the arm 33 of the shaft 29. The arm 33' is connected to the link bar 21 of the right engine at its extension 22 by a connecting rod 38'. The right and left driving wheels being fixed on their axle with their crank pins 40 and 40' relatively at 90° apart, the rock levers 30 and 30' are always at the same relative angle to each other. Thus constructed and connected it is manifest that the rock shaft 29 as connected to the cross head of the right engine by the lever 30 and the link 34, and to the link bar 21 of the radius rocker of the left engine by the short arm 33 of the shaft and the connecting rod 38, will perform the same functions and produce the same movements of the radius rocker and bell crank of the left engine, at the same relative times and speeds, as would be produced if the left engine were provided with an eccentric rod that is connected to the radius rocker as in my said former gear. And it is also manifest that the rock shaft 29 as connected to the cross head of the right engine by the lever 30 and the link 34, and to the arm 25 of the rocker sleeve 24 of the bell crank of the right engine, by the short arm 31 and the connecting rod 36, will perform the same function and produce the same movements of the valve of the right engine, as is performed and produced by the said lever fulcrumed on the bell crank of my said former gear and connected to the valve and cross head. In like manner the rock shaft 29' and its connections to the cross head and bell crank of the left engine, and to the radius rocker of the right engine as described, perform the same functions and produce the same movements of the radius rocker and bell crank of the right engine that are produced by the eccentric rod in my said former gear, and also perform the same functions and produce the same movements of the valve of the left engine as are produced in my former gear by said lever fulcrumed on the bell crank and connected to the valve and the cross head of the left engine.

By operating the valve gear of each engine by the cross head of the other as shown and described, I avoid the use of a return crank and eccentric rod on each engine, and thereby by reason of the greater length of the connecting rod render the effect of vibration on the valve movements negligible.

What I claim to be new is—

1. In a reversible variable cut-off valve gear for locomotives, the combination with the main frame, and the cross head and valve stem of each engine, of a valve gear for each engine comprising a fixed support, a movable support mounted on the fixed support, a radius rocker having a rocker pivot journaled on the movable support and adjustable thereby through an arc, a bell crank journaled on the fixed support, a link connected to one arm of the bell crank and to the radius rocker at a radius from its rocker pivot equal to the radius of the arc of adjustment of the rocker pivot, and means to jointly adjust the movable supports in parallel positions, means connecting the link rod of each gear to the cross head of the other engine, and adapting said cross head to oscillate the radius rocker and bell crank, and means connecting the other arm of the bell crank with the valve stem and with the cross head of its own engine, and adapting the bell crank and cross head of each engine to both jointly and severally reciprocate the valve of the engine.

2. In a reversible variable cut-off valve gear for locomotives, the combination with the main frame, the cross heads and the slide valves of the engines, of a pair of rock shafts journaled transverse the frame, one for each cross head, each rock shaft having a long rock arm mounted on one end and extending downward beside a cross head, a short rock arm extending downward above the same cross head, and a short rock arm at the opposite end extending over the opposite cross head, a link rod connecting each long rock arm with the adjacent cross head, a pair of fixed supports mounted on the main frame, each having a movable support, a radius rocker mounted on each movable support and having its rocker pivot adjustable thereby through an arc and having a pivot pin at a radius from its rocker pivot equal to the radius of the arc of the adjustment of the rocker pivot, a bell crank journaled on each support, a link rod connecting one arm of each bell crank to the pivot pin of the adjacent radius rocker, a rocker lever pivoted on the other arm of each bell crank and having oppositely extending arms, means to jointly adjust and hold the rocker pivots of the radius rockers in different parallel positions in the arcs of their movement, a rod connecting the short rock arm that is adjacent to the long rock arm of each rock shaft with an arm of the rocker lever of its respective bell crank, stems respectively connecting the other arms of the rocker levers with the valves, and a rod connecting the other short arm of each rock shaft with the link connecting the radius rocker to the bell crank.

In witness whereof I have hereunto subscribed my name, at Toledo, Ohio, in the presence of two subscribing witnesses, this 14th day of August, 1911.

ABNER D. BAKER.

In presence of—
Wm. J. Fritsche,
Frank W. MacPhie.